United States Patent Office 3,637,720
Patented Jan. 25, 1972

3,637,720
CERTAIN SUBSTITUTED PYRIDYL PHENYL ETHERS
Ryuzo Nishiyama, Kyoto, and Kanichi Fujikawa, Isao Yokomichi, and Fumio Kimura, Kusatsu-shi, Japan, assignors to Ishihara Sangyo Co., Ltd., Osaka, Japan
No Drawing. Filed June 17, 1968, Ser. No. 737,324
Claims priority, application Japan, June 15, 1967, 42/37,832
Int. Cl. C07d 31/30
U.S. Cl. 260—297 R    10 Claims

ABSTRACT OF THE DISCLOSURE

A compound having the formula

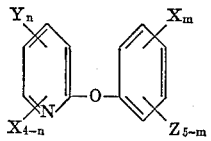

wherein X represents a hydrogen atom, Y being a chlorine atom, or a methyl radical; $n$ is an integer of 1 to 4; Z represents a chlorine atom, a methyl radical, or a nitro radical; and $m$ is an integer of 1 to 5, and a herbicidally effective salt or N-oxide thereof.

BACKGROUND OF THE INVENTION

(1) Field of the invention

The present invention relates to novel compounds of chloro- or methyl-substituted pyridyl phenyl ethers and to a method of using the same as a herbicide for controlling germination or growth of undesirable plants.

(2) Description of the prior art

Since the discovery of the existence of auxin as an agent for controlling the growth of plants, various herbicides have been proposed. Herbicide compounds which have been heretofore known include, for example, (1) aliphatic acids, aromatic acids, aryloxy acids and their derivatives such as salts and esters thereof; (2) ureas, carbamates, thiocarbamates, amides and anilides; (3) heterocyclic compounds, such as triazols and triazines; and (4) various inorganic compounds.

On the other hand, in order to take away various undesirable plants under various wether and soil conditions, a herbicide adapted to each condition is required and, as long as undesirable plants exist, a study for more ideal agents will be continued. For example, one requirement for an ideal herbicide in culture of crops is to kill undesirable weeds without injuring the crops.

One object of the present invention is to provide a compound having an excellent herbicidal effect.

Another object is to provide compounds capable of selectively controlling germination and growth in the family of Gramineae, that is, selectively controlling germination and growth of a barnyard grass without controlling the growth of rice plants. Further object is to provide compounds capable of controlling the germination and growth of other weeds.

SUMMARY OF THE INVENTION

The compounds of the present invention include compounds represented by the formula

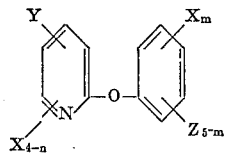

wherein X being a hydrogen atom, Y being a chlorine atom or a methyl radical, $n$ being an integer of 1 to 4, Z being a chlorine atom, a methyl radical or a nitro radical, and $m$ being an integer of 1 to 5, and a herbicidally effective salt or N-oxide thereof.

One embodiment of the above formula can be represented by the following formula

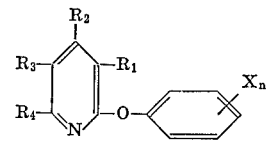

in which $R_1$–$R_4$ are used to represent the combination of $Y_n$ and $X_{4-n}$ and $X_n$ is used to represent the combination $X_m$ and $Z_{5-m}$.

In the above $R_1$ and $R_3$ is a hydrogen atom or a chlorine atom; each of $R_2$ and $R_4$ is a hydrogen atom or a methyl group; X is a methyl group or a nitro group and $n$ is an integer from 1 to 3, provided that at least one of $R_1$, $R_2$, $R_3$ and $R_4$ is a chlorine atom or a methyl group and, when at least one of $R_1$ and $R_3$ is a chlorine atom, $R_2$ and $R_4$ are hydrogen atoms and when at least one of $R_2$ and $R_4$ is a methyl group, $R_1$ and $R_3$ are hydrogen atoms.

DETAILED DESCRIPTION OF THE INVENTION

The method of controlling plants in the present invention is to control undesirable plants by applying a herbicide containing at least one or more of the above-described compounds as an active ingredient in an amount sufficient to control the germination or growth of the undesirable plants.

The compounds of the present invention can be synthesized from phenol compounds having or not having corresponding substituents, 2-bromo-pyridine compounds having corresponding substituents and anhydrous potassium carbonate, for example. In general, the compounds can be obtained by heating and reacting phenol compounds with anhydrous potassium carbonate to produce potassium phenolate compounds, and then heating and reacting the resulting phenolate compounds with 2-bromo-pyridine compounds. The first step of the reaction process is carried out at a temperature of 120–130° C. and the second step is completed at a temperature of 210 to 220° C. for three to five hours. The desired compounds can be also obtained by heating and reacting the three compounds all together at the same time.

The above described reactions are shown by the following equations:

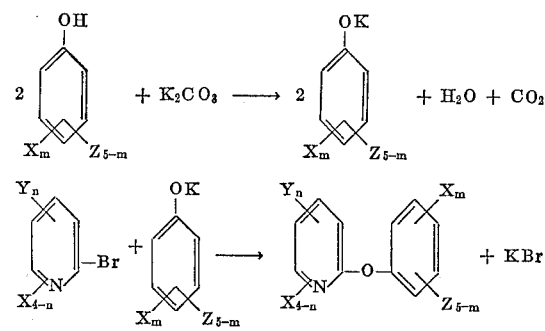

wherein X, Y, Z, $n$ and $m$ are the same as defined above.

Syntheses of the representative compounds in the present invention are illustrated in the following examples:

SYNTHESIS EXAMPLES 1 TO 11

Example 1

Synthesis of 2-(3,5-dimethylphenoxy)-6-methylpyridine 12.2 g. (0.1 mole) of 3,5-dimethylphenol, 8.6 g. (0.05 mole) of 2-bromo-6-methylpyridine, and 6.9 g. (0.05 mole) of anhydrous potassium carbonate were charged in a flask provided with a stirrer, a condenser, a thermometer, and a separatory funnel, and were heated gradually to a temperature of 200 to 210° C. under stirring, and, after maintaining at the temperature for three hours, was allowed to cool. The resulting reaction product was poured into a water, and was made strongly basic by adding a 1 N-aqueous solution of sodium hydroxide, and, then, the solution was extracted with ethyl ether. The ether layer was separated, and then dried over anhydrous sodium sulfate. After distilling out ethyl ether, the residue was distilled under reduced pressure. Thus, 8.1 g. of 2-(3,5-dimethylphenoxy)-6-methylpyridine boiling at 136–137° C./3 mm. Hg was obtained.

Example 2

Synthesis of 2-(4-chlorophenoxy)-3,5-dichloropyridine 5.1 g. (0.04 mole) of 4-chlorophenol and 2.8 g. (0.02 mole) of anhydrous potassium carbonate were charged into a 50 ml. three-necked flask provided with a stirrer, a thermometer, and a reflux condenser, and were heated in an oil bath to a temperature of 120 to 130° C. under stirring, and, then, 4.5 g. (0.02 mole) of 2-bromo-3,5-dichloropyridine was added thereto and was heated to a temperature of 200 to 210° C. and was maintained at the temperature under stirring for five hours.

The resulting reaction product after allowing to cool was poured in 300 ml. of water and was extracted with 300 ml. of ethyl ether in a separatory funnel. The ether layer separated, and was washed two times with 300 ml. of 2 N-aqueous solution of sodium hydroxide divided into two parts and subsequently was thoroughly washed three times with 400 ml. of water divided into three parts, and then was dried over anhydrous sulfate overnight. After distilling out ethyl ether, the residue was distilled under reduced pressure to give 3.7 g. of the object product boiling at 165 to 167° C./2 mm. Hg, which was solidified to form a white solid melting at 93 to 94° C.

Example 3

Synthesis of 2-(4-nitrophenoxy)-3,5-dichloropyridine

Synthesis (2) was followed in the same manner using 4.5 g. (0.02 mole) of 2-bromo-3,5-dichloropyridine, 5.6 g (0.04 mole) of 4-nitrophenol, and 2.8 g. (0.02 mole) of anhydrous potassium carbonate. The resulting reaction product after allowing to cool was placed into 300 ml. of water to precipitate a light yellow colored solid. The solid, after washing with a 10% aqueous solution of sodium hydroxide and subsequently with water, was recrystallized from cyclohexane to obtain the object product; M.P. 104 to 105° C.; yield 3.2 g.

Example 4

Synthesis of 2-(3,5-dimethylphenoxy)-5-chloropyridine

Synthesis (2) was followed in the same manner using 3.8 g. (0.02 mole) of 2-bromo-5-chloropyridine, 5.0 g. (0.04 mole) of 3,5-dimethylphenol, and 2.8 g. (0.02 mole) of anhydrous potassium carbonate to obtain the object product; B.P. 155 to 159° C./2 mm. Hg; yield 3.0 g.

Example 5

Synthesis of 2-(3-chlorophenoxy)-4-chloropyridine 2.6 g. (0.02 mole) of 3-chlorophenol and 2.8 g. (0.02 mole) of anhydrous potassium carbonate were charged into the similar reaction vessel as described in (2), and were heated to a temperature of 120 to 130° C. under stirring, and subsequently 2.9 g. (0.02 mole) of 2,4-dichloropyridine was added thereto and further was heated and reacted at 150° C. under stirring for three hours. The after treatment was carried out in the same manner as in (2) B.P.: 152–159° C./2.8 mm. Hg; yield 2.9 g.

Example 6

Synthesis of 2-(3,4-dichlorophenoxy)-6-methylpyridine 16.3 g. (0.1 mole) of 3,4-dichlorophenol and 6.9 g. (0.05 mole) of anhydrous potassium carbonated were charged into the similar reaction vessel as in (2) and 8.6 g. (0.05 mole) of 2-bromo-6-methylpyridine was added thereto and immediately was heated and reacted at a temperature of 200 to 210° C. in an oil bath for three hours. The resulting reaction product after allowing to cool was poured into 200 ml. of water and the aqueous solution was extracted with ethyl ether, and the ether layer was washed with a 10% aqueous solution of sodium hydroxide and water.

The ether layer was dried over anhydrous sodium sulfate. After distilling out ethyl ether, the residue was distilled under reduced pressure. B.P.: 139–141° C./1 mm. Hg; M.P.: 53–56° C.; yield 8.0 g.

Example 7

Synthesis of 2 - (2,4,5 - trichlorophenoxy)-4-methylpyridine 8.6 g. (0.05 mole) of 2-bromo-4-methylpyridine, 19.7 g. (0.1 mole) of 2,4,5-trichlorophenol, and 6.9 g. (0.05 mole) of anhydrous potassium carbonate were reacted in the same manner as described in (6). The after-treatment was carried out in the same manner as in (3), but the recrystallization was conducted with ethanol. M.P.: 68.5–70.0° C.; yield: 6.5 g.

Example 8

Synthesis of 2 - (2,4,6 - trichlorophenoxy)-3-methylpyridine 8.6 g. (0.05 mole) of 2-bromo-3-methylpyridine, 19.7 g. (0.1 mole) of 2,4,6-trichlorophenol, and 6.9 g. (0.05 mole) of anhydrous potassium carbonate were reacted and aftertreated in the same manner as in (6). B.P.: 136–146° C./3 mm. Hg; yield: 6.3 g.

Example 9

Synthesis of 2-(4-methylphenoxy)-4,6-dimethylpyridine 9.2 g. (0.05 mole) of 2-bromo-4,6-dimethylpyridine, 10.8 g. (0.1 mole) of 4-methylphenol, and 6.9 g. (0.05 mole) of anhydrous potassium carbonate were reacted and after-treated in the same manner as in (6). B.P.: 135–138° C./2.2 mm. Hg; yield: 7.0 g.

Example 10

Synthesis of 2-(4-chlorophenoxy)-5-chloropyridine 2.9 g. (0.02 mole) of 2-bromo-5-chloropyridine, 5.2 g. (0.04 mole) of 4-chlorophenol, and 2.8 g. (0.02 mole) of anhydrous potassium carbonate were reacted in the same manner as in (5) and were aftertreated in the same manner as in (2). B.P.: 140–147° C./2 mm. Hg; yield: 2.9 g.

Example 11

Synthesis of 2-(4-chlorophenoxy)-5-chloropyridine-N-oxide.—1.8 g. (0.0078 mole) of 2-(4-chlorophenoxy)-5-chloropyridine, 20 ml. of trifluoroacetic acid, and 2 ml. (0.018 mole) of 30% hydrogen peroxide were refluxed on an oil bath in the same manner as in (2) for 7 hours. After the reaction was completed, trifluoroacetic acid was removed under reduced pressure, and 250 ml. of chloroform and 1 g. of potassium carbonate were added to the residue and maintained at the room temperature under stirring for 8 hours. After filtering the mixture to remove an insoluble matters, chloroform was removed from the filtrate under reduced pressure. M.P.: 127–129° C.; yield: 1.6 g.

Examples of the compounds represented by the above formula are listed in Table 1.

TABLE 1

| Active Ingredient No. | Compound | Melting point (° C.) | Boiling point (° C./mm. Hg) |
|---|---|---|---|
| 1 | 2-phenoxy-6-methylpyridine | | 122-123.5/5 |
| 2 | 2-(2-chlorophenoxy)-6-methylpyridine | | 131-133/3 |
| 3 | 2-(3-chlorophenoxy)-6-methylpryridine | 131.5-134.4 | |
| 4 | 2-(4-chlorophenoxy)-6-methylpyridine | | 137-138/3 |
| 5 | 2-(2,4-dichlorophenoxy)-6-methylpyridine | | 151-153/3 |
| 6 | 2-(2,5-dichlorophenoxy)-6-methylpyridine | | 145-147/3 |
| 7 | 2-(2,4,5-trichlorophenoxy)-6-methylpyridine | | 158-163/3.5 |
| 8 | 2-(2-methylphenoxy)-6-methylpyridine | 121.5-123.4 | |
| 9 | 2-(3-methylphenoxy)-6-methylpyridine | | 125-126.5/2 |
| 10 | 2-(4-methylphenoxy)-6-methylpyridine | | 131-133/3 |
| 11 | 2-(2,4-dimethylphenoxy)-6-methylpyridine | | 141-144/3 |
| 12 | 2-(2,4-dimethylphenoxy)-6-methylpyridine | | 145-147/3 |
| 13 | 2-(3,5-dimethylphenoxy)-6-methylpyridine | | 136-137/3 |
| 14 | 2-(2-chlorophenoxy)-4-methylpyridine | 71.5-73.5 | |
| 15 | 2-(3-chlorophenoxy)-4-methylpyridine | 62.2-62.5 | |
| 16 | 2-(4-chlorophenoxy)-4-methylpyridine | 30.5-30.7 | |
| 17 | 2-(2,5-dichlorophenoxy)-4-methylpryridine | 76-78 | |
| 18 | 2-(2,4,5-trichlorophenoxy)-4-methylpyridine | 68.5-70.0 | |
| 19 | 2-(2,4,6-trichlorophenoxy)-4-methylpyridine | 105.5-106.5 | |
| 20 | 2-(2-methylphenoxy)-4-methylpyridine | 47.5-48.3 | |
| 21 | 2-(3-methylphenoxy)-4-methylpyridine | | 114-116/4 |
| 22 | 2-(4-methylphenoxy)-4-methylpyridine | 33.5-34.5 | |
| 23 | 2-(2,4-dimethylphenoxy)-4-methylpyridine | | 129.5-131.5/4 |
| 24 | 2-(3,4-dimethylphenoxy)-4-methylpyridine | | 137-138/3.5 |
| 25 | 2-(3,5-dimethylphenoxy)-4-methylpyridine | | 145-148/3 |
| 26 | 2-(2-nitrophenoxy)-4-methylpyridine | 74-80 | |
| 27 | 2-(3-nitrophenoxy)-4-methylpyridine | 98-100.7 | |
| 28 | 2-(4-nitrophenoxy)-4-methylpyridine | 84.5-87 | |
| 29 | 2-(2-chlorophenoxy)-3-methylpyridine | | 124-125/6 |
| 30 | 2-(3-chlorophenoxy)-3-methylpyridine | | 126-127/6 |
| 31 | 2-(4-chlorophenoxy)3-methylpyridine | 68-71 | |
| 32 | 2-(2,4-dichlorophenoxy)-3-methylpyridine | | 117-123/2 |
| 33 | 2-(2,5-dichlorophenoxy)-3-methylpyridine | | 123-125/2 |
| 34 | 2-(2,4,5-trichlorophenoxy)-3-methylpyridine | | 137-142/2 |
| 35 | 2-(2,4,6-trichlorophenoxy)-3-methylpyridine | | 136-140/3 |
| 36 | 2-(2-methylphenoxy)-3-methylpyridine | | 100-104/4.5 |
| 37 | 2-(3-methylphenoxy)-3-methylpyridine | | 137-140/8 |
| 38 | 2-(4-methylphenoxy)-3-methylpyridine | | 136-138.5/8 |
| 39 | 2-(2-chlorophenoxy)-4,6-dimethylpyridine | | 116-120/1 |
| 40 | 2-(3-chlorophenoxy)-4,6-dimethylpyridine | | 132-137/1.8 |
| 41 | 2-(4-chlorophenoxy)-4,6-dimethylpyridine | | 120-125/0.6 |
| 42 | 2-(2,4-dichlorophenoxy)-4,6-dimethylpyridine | | 124-128/0.4 |
| 43 | 2-(2,5-dichlorophenoxy)-4,6-dimethylpyridine | | 120-122/0.3 |
| 44 | 2-(2,4,5-trichlorophenoxy)-4,6-dimethylpyridine | | 142-147/0.5 |
| 45 | 2-(2-methylphenoxy)-4,6 dimethylpyridine | | 107-110/0.7 |
| 46 | 2-(3-methylphenoxy)-4,6-dimethylpyridine | | 133-137/2 |
| 47 | 2-(4-methylphenoxy)-4,6-dimethylpyridine | | 133-138/2 |
| 48 | 2-phenoxy-5-chloropyridine | | 127-131/7 |
| 49 | 2-(2-chlorophenoxy)-5-chlorophridine | | 135-142/2 |
| 50 | 2-(3-chlorophenoxy)-5-chloropyridine | | 195-197/7 |
| 51 | 2-(4-chlorophenoxy)-5-chloropyridine | | 140-147/2 |
| 52 | 2-(2,4-chlorophenoxy)-5-chloropyridine | | 142-146/2 |
| 53 | 2-(2,4,6-trichlorophenoxy)-5-chloropyridine | | 185-190/2 |
| 54 | 2-(2-methylphenoxy)-5-chloropyridine | | 135-138/2 |
| 55 | 2-(3-methylphenoxy)-5-chloropyridine | | 149-153/2 |
| 56 | 2-(4-methylphenoxy)-5-chloropyridine | | 135-140/2 |
| 57 | 2-(3,5-dimethylphenoxy)-5-chloropyridine | | 155-159/2 |
| 58 | 2-(4-nitrophenoxy)-5-chloropyridine | 78-80 | |
| 59 | 2-phenoxy-3,5-dichloropyridine | | 154-155/2 |
| 60 | 2-(2-chlorophenoxy)-3,5-dichloropyridine | | 160-165/2 |
| 61 | 2-(3-chlorophenoxy)-3,5-dichloropyridine | | 165-170/2 |
| 62 | 2-(4-chlorophenoxy)-3,5-dichloropyridine | | 165-167/2 |
| 63 | 2-(2,4-dichlorophenoxy)-3,5-dichloropyridine | | 177-180/2 |
| 64 | 2-(2,5-dichlorophenoxy)-3,5-dichloropyridine | 75-77 | |
| 65 | 2-(2,4,6-trichlorophenoxy)-3,5-dichloropyridine | | 175-176/2 |
| 66 | 2-(2,3,4,6-tetrachlorophenoxy)-3,5-dichloropyridine | 77-80 | |
| 67 | 2-(2-methylphenoxy)-3,5-dichloropyridine | | 150-155/2 |
| 68 | 2-(3-methylphenoxy)-3,5-dichloropyridine | | 155-162/2 |
| 69 | 2-(4-methylphenoxy)-3,5-dichloropyridine | | 159-165/2 |
| 70 | 2-(3,5-dimethylphenoxy)-3,5-dichloropyridine | | 166-177/2 |
| 71 | 2-(3-nitrophenoxy)-3,5-dichloropyridine | 90-92 | |
| 72 | 2-(3-nitrophenoxy)-3,5-dichloropyridine | 99-102 | |
| 73 | 2-(4-nitrophenoxy)-3,5-dichloropyridine | 104-105 | |
| 74 | 2-(4-chlorophenoxy)-5-chloropyridine-N-oxide | 127-129 | |
| 75 | 2-(3,5-dimethylphenoxy)-6-methylpyridinehydrochloride | 123-128 | |
| 76 | 2-(3,5-dimethylphenoxy)-6-methylpyridine acid sulfate | 148-150 | |
| 77 | 2-phenoxy-4-chloropyridine | | 124-133/2 |
| 78 | 2-(2-chlorophenoxy)-4-chloropyridine | | 153-155/1.5 |
| 79 | 2-(3-chlorophenoxy)-4-chloropyridine | | 152-159/2.8 |
| 80 | 2-(4-chlorphenoxy)-4-chloropyridine | | 162-171/7 |
| 81 | 2-(2,4-dichlorphenoxy)-4-chloropyridine | | 151-155/1 |
| 82 | 2-(2,3,5-trichlorophenoxy)-4-chloropyridine | | 166-174/1.5 |
| 83 | 2-(2,3,4,6-tetrachlorophenoxy)-4-chloropyridine | | 185-190/1 |
| 84 | 2-(2,3,4,5,6-pentachlorophenoxy)-4-chloropyridine | | 202-209/3.3 |
| 85 | 2-(2-methylphenoxy)-4-chloropyridine | | 130-139/3 |
| 86 | 2-(3-methylphenoxy)-4-chloropyridine | | 136-139/2 |
| 87 | 2-(4,methylphenoxy)-4-chloropyridine | | 147-152/2.8 |
| 88 | 2-(2,4-dimethylphenoxy)-4-chloropyridine | | 142-149/3 |
| 89 | 2-(2,5-dimethylphenoxy)-4-chloropyridine | | 142-148/4 |
| 90 | 2-(3,4-dimethylphenoxy)-4-chloropyridine | | 162-167/3 |
| 91 | 2-(3,5-dimethylphenoxy)-4-chlorpyridine | | 155-156/1.5 |
| 92 | 2-(3-nitrophenoxy)-4-chloropyridine | 125-127 | |
| 93 | 2-(3,4,5-trimethylphenoxy)-6-methylpyridine | 60-63 | |
| 94 | 2-(3,4-dichlorophenoxy)-6-methylpyridine | 53-56 | |

The salts of the compounds represented by the above-mentioned formula include the salts of mineral acids such as sulfuric acid, hydrochloric acid, etc., and the salts of picric acid. The N-oxides of the compounds represented by the above formula can be obtained by the known method, for example, by reacting the compound with hydrogen peroxide in trifluoroacetic acid.

The test examples of the compounds of the present invention follow. The number of the active ingredient in the test example corresponds to the number of the active ingredient in Table 1.

TEST EXAMPLES 1 TO 56

(a) Seeds for test: Mung bean and barnyard grass (b) Agent for test: A liquid containing an active ingredient dispersed or dissolved in water in the concentration of 100 p.p.m. and 10 p.p.m.

(c) Test method: 10 uniformly germinated seeds for testing were placed in a dish having a diameter of 9 cm., and 10 ml. of an agent for test was poured thereto. The dish was placed in a thermostat at 30° C. After 24 hours in case of the mung bean and after 48 hours in case of the barnyard grass, the dish was taken out and the effectiveness of the agent was measured by visible observation to obtain the results as shown in Table 2.

(d) Test results: See Table 2.

In the Table 2, A, B, C, etc. represent the degree of control of germinations as follows:

A: Completely controlling germination in the 10 p.p.m. concentration of active ingredient.

A': Controlling germination by one half in comparison with untreated plot in the 10 p.p.m. concentration of active ingredient.

B: Completely controlling germination in the 100 p.p.m. concentration of active ingredient.

B': Controlling germination by one half in comparison with untreated plot in the 100 p.p.m. concentration of active ingredient.

C: Not controlling germination even in the 100 p.p.m. concentration of active ingredient.

TABLE 2

| Test Experiment No. | Active Ingredient No. | Degree of germination control — Mung bean | Barnyard grass | Test Experiment No. | Active Ingredient No. | Degree of germination control — Mung bean | Barnyard grass |
|---|---|---|---|---|---|---|---|
| 1 | 1 | C | B | 29 | 33 | C | A'-A |
| 2 | 2 | C | B | 30 | 34 | C | B-A' |
| 3 | 3 | C | B | 31 | 36 | C | B |
| 4 | 4 | C | B | 32 | 37 | C | B |
| 5 | 5 | C | B | 33 | 38 | C | B |
| 6 | 6 | C | B | 34 | 39 | C | B-A' |
| 7 | 7 | C | B | 35 | 40 | C | B |
| 8 | 8 | C | B | 36 | 41 | C | A'-B |
| 9 | 9 | C | B | 37 | 42 | C | B-B' |
| 10 | 10 | C | B | 38 | 43 | C | B |
| 11 | 11 | C | B | 39 | 44 | C | B |
| 12 | 12 | C | B | 40 | 45 | C | B |
| 13 | 13 | A | A | 41 | 46 | C | A'-B |
| 14 | 14 | C | B | 42 | 47 | C | B-A' |
| 15 | 15 | C | B | 43 | 49 | C | B |
| 16 | 16 | B' | A' | 44 | 51 | C | A-A' |
| 17 | 20 | B' | B | 45 | 52 | C | B-A' |
| 18 | 21 | B' | B | 46 | 54 | C | B |
| 19 | 22 | B | B | 47 | 57 | C | B |
| 20 | 23 | C | A'-B | 48 | 59 | C | B |
| 21 | 24 | C | B | 49 | 61 | C | B-A' |
| 22 | 25 | C | A'-B | 50 | 63 | C | B |
| 23 | 26 | C | B | 51 | 65 | C | B |
| 24 | 28 | A | A | 52 | 66 | C | B |
| 25 | 29 | C | A'-B | 53 | 67 | C | B-A' |
| 26 | 30 | C | B | 54 | 68 | C | A' |
| 27 | 31 | C | B | 55 | 69 | C | B'-B |
| 28 | 32 | C | B | 56 | 70 | C | B |

TABLE 3

| Test Experiment No. | Active Ingredient No. | Degree of germination control — Barnyard grass | Weed | Test Experiment No. | Active Ingredient No. | Degree of germination control — Barnyard grass | Weed |
|---|---|---|---|---|---|---|---|
| 57 | 3 | $\alpha'\sim\alpha$ | $\gamma$ | 91 | 40 | $\alpha\sim\alpha'$ | $\alpha'$ |
| 58 | 4 | $\alpha'$ | $\beta'$ | 92 | 41 | $\alpha$ | $\alpha$ |
| 59 | 5 | $\alpha'\sim\alpha$ | $\gamma$ | 93 | 42 | $\alpha$ | $\alpha$ |
| 60 | 6 | $\alpha$ | $\gamma$ | 94 | 43 | $\alpha$ | $\alpha'$ |
| 61 | 7 | $\alpha\sim\alpha'$ | $\gamma$ | 95 | 44 | $\alpha'$ | $\beta$ |
| 62 | 9 | $\beta$ | $\beta$ | 96 | 46 | $\alpha'$ | $\beta$ |
| 63 | 10 | $\beta$ | $\gamma$ | 97 | 47 | $\alpha'$ | $\alpha'$ |
| 64 | 11 | $\beta$ | $\gamma$ | 98 | 48 | $\alpha$ | $\alpha'$ |
| 65 | 12 | $\alpha$ | $\beta'$ | 99 | 49 | $\alpha'$ | $\beta$ |
| 66 | 13 | $\alpha$ | $\beta'$ | 100 | 50 | $\alpha$ | $\beta$ |
| 67 | 14 | $\alpha'$ | $\gamma$ | 101 | 51 | $\alpha$ | $\beta$ |
| 68 | 15 | $\alpha$ | $\gamma$ | 102 | 52 | $\alpha$ | $\beta$ |
| 69 | 16 | $\alpha'$ | $\gamma$ | 103 | 53 | $\beta$ | $\gamma$ |
| 70 | 17 | $\alpha$ | $\beta'$ | 104 | 54 | $\gamma$ | $\gamma$ |
| 71 | 18 | $\alpha$ | $\gamma$ | 105 | 55 | $\alpha$ | $\beta$ |
| 72 | 19 | $\beta$ | $\gamma$ | 106 | 56 | $\alpha$ | $\beta$ |
| 73 | 21 | $\alpha$ | $\beta'$ | 107 | 57 | $\alpha$ | $\beta$ |
| 74 | 23 | $\beta$ | $\gamma$ | 108 | 58 | $\alpha$ | $\beta$ |
| 75 | 24 | $\beta$ | $\gamma$ | 109 | 59 | $\alpha$ | $\beta$ |
| 76 | 25 | $\alpha\sim\alpha'$ | $\gamma$ | 110 | 60 | $\alpha$ | $\beta$ |
| 77 | 26 | $\alpha'\sim\beta$ | $\gamma$ | 111 | 61 | $\alpha$ | $\beta$ |
| 78 | 27 | $\alpha$ | $\alpha$ | 112 | 62 | $\alpha$ | $\beta$ |
| 79 | 28 | $\alpha$ | $\alpha$ | 113 | 63 | $\alpha$ | $\beta$ |
| 80 | 29 | $\beta'$ | $\beta$ | 114 | 64 | $\beta$ | $\alpha$ |
| 81 | 30 | $\alpha$ | $\beta$ | 115 | 65 | $\alpha\sim\alpha'$ | $\alpha$ |
| 82 | 31 | $\alpha$ | $\beta$ | 116 | 66 | $\alpha'$ | $\beta$ |
| 83 | 32 | $\alpha'$ | $\beta$ | 117 | 67 | $\alpha$ | $\beta$ |
| 84 | 33 | $\alpha$ | $\alpha$ | 118 | 68 | $\alpha$ | $\beta$ |
| 85 | 34 | $\alpha'\sim\beta$ | $\alpha$ | 119 | 69 | $\alpha$ | $\alpha$ |
| 86 | 35 | $\beta\sim\beta'$ | $\gamma$ | 120 | 70 | $\alpha\sim\alpha'$ | $\alpha$ |
| 87 | 36 | $\beta\sim\beta'$ | $\gamma$ | 121 | 71 | $\alpha\sim\alpha'$ | $\alpha$ |
| 88 | 37 | $\alpha\sim\beta'$ | $\gamma$ | 122 | 72 | $\alpha$ | $\alpha$ |
| 89 | 38 | $\alpha$ | $\beta$ | 123 | 73 | $\alpha$ | $\alpha$ |
| 90 | 39 | $\alpha\sim\alpha'$ | $\alpha$ | 124 | 74 | $\alpha$ | $\alpha$ |

TEST EXAMPLES 57 TO 124

(a) Seeds for test: Barnyard grass and weeds (b) Test method: 10 uniformly germinated seeds for testing were sowed in the depth of about 0.5 cm. in a dish having a diameter of 9 cm., and after 1 to 2 days, an aqueous dispersion or solution containing an active ingredient was uniformly sprayed thereto in the rate of 50 g./acre of active ingredient. During the test period, the dish was sealed and allowed to stand in a green house. At the most effective period after the treatment, the dish was taken out and the effectiveness of the agent was evaluated by visible observation to obtain the results as shown in Table 3.

(c) Test results: See Table 3.

In Table 3, $\alpha$, $\beta$, $\gamma$, etc. represent the degree of effectiveness on the test plants as follows:

$\alpha$: Germination was completely controlled or test plants were killed after their germination and growth, or in comparison with untreated plot their elongation of above ground and root portion is recognized to be less than 10% in comparison with untreated plot.

$\beta$: The elongation is recognized to be 30 to 50% in comparison with untreated plot.

$\beta'$: The elongation is recognized to be 50 to 70% in comparison with untreated plot.

$\gamma$: The elongation is recognized to be 70 to 100% in comparison with untreated plot.

TEST EXAMPLES 125 TO 136

(a) Seeds for test: Barnyard grass and weeds (b) Test method: A given amount of barnyard grass seeds and a mixture of weed (false pimpernel, Monochoria, toothcup, *Cyperus microiria*) seeds and soil were spread in a 1/10,000 are plot and cultured in flooded condition. At the initial period of germination a given amount of an aqueous dispersion or solution of an active ingredient was poured uniformly thereto. The tests were carried out in a green house and the plots were maintained in its water-depth to 3 cm. On the 14th day after pouring the agent, each test plant was pulled out and its weight in dry matter was measured, and the degree of controlling growth was determined by the following equation:

Degree of control of growth $$= 1 - \frac{\text{(Dry matter weight of survival plants in treated plot)}}{\text{(Dry matter weight of survival test plants in untreated plot)}} \times 100\%$$

(c) Test results: See Table 4.

TABLE 4

| Test Example Nos. | Active Ingredient No. | Degree of control of growth depending upon the amount of active ingredient, percent | | |
|---|---|---|---|---|
| | | 50 | 20 | 10 |
| | | Amount of active ingredient, g./are | | |
| 125 | 12 | 100 | 48 | 15 |
| 126 | 13 | 100 | 100 | 100 |
| 127 | 18 | 100 | 100 | 45 |
| 128 | 25 | 100 | 45 | 25 |
| 129 | 51 | 100 | 100 | 49 |
| 130 | 52 | 100 | 100 | 49 |
| 131 | 57 | 100 | 70 | 54 |
| 132 | 58 | 100 | 62 | 60 |
| 133 | 61 | 100 | 100 | 59 |
| 134 | 62 | 100 | 100 | 100 |
| 135 | 69 | 100 | 100 | 70 |
| 136 | 73 | 100 | 100 | 59 |

In test Examples 125 to 136, chlorosis is revealed on the plants. This phenomenon is remarkable in Test Examples 127 to 130 and 132 to 135.

TEST EXAMPLE 137

The seeds of cucumber, rice and barnyard grass were sowed on a 1/10,000 are plot and were covered with soil in thickness of about 0.5 cm. An aqueous dispersion or solution containing the active ingredient No. 73 was poured thereon in the rate of 10, 30 and 50 g./are, and the state of germination was observed. The results are as follows:

Cucumber: In 10 and 30 g./are plots the germination and growth were quite normal and in 50 g./are plots the germination was somewhat delayed, however, the growth was almost normal.

Rice: In 10 g./are plots the germination and growth were quite normal, and in 30 and 50 g./are plots the initial growth was somewhat controlled, however, thereafter the growth became almost normal.

Barnyard grass: In 30 and 50 g./are plots all plants were killed, and even in 10 g./are plots most of the plants were killed.

TEST EXAMPLE 138

Three rice seedlings that had been growth during 35 days after seeding were transplanted to a 1/500 are plot in which weeds and barnyard grasses were grown, and, on the seventh day after transplanting, were treated with an aqueous dispersion or solution containing the active ingredient No. 73. in the rate of 40 g./are. As a result, the weeds and barnyard grasses were controlled but the growth of rice was normal.

In addition, an excellent herbicidal effect could be obtained for cheat grass, wild oats, chick weed, foxtail, alfalfa, Johnson grass, velvet leaf, curled dock, nut grass, pigweed, yellow rocket, crabgrass, lamb's-quarter duckweed, Salvinia, Elodea, Potamogeton, Alopecurus, yellow nutgrass, cocklebur, fiddleneck and the like.

As is already clear from the above descriptions, the agent of the present invention has an excellent herbicidal effectiveness and, in particular, has an action of selectively controlling growth in the family of Gramineae and thereby can sufficiently control other Gramineae, particularly barnyard grass, without injuring rice plants. Accordingly, the agent of the present invention is not only best suited as a herbicide for rice culture, but also can be broadly employed in a farm, a field, an orchard, a kitchen garden, and the like.

The optimum quantity of the agent of the present invention to be employed can vary depending upon the forms of the agent, the methods of using the agent, the times or seasons of using the agent, the kinds of object weeds, and the like, although an amount of active ingredient to be used in normally 50 to 1,000 per 10 ares preferably 100 to 500 g. per 10 ares.

In general, by increasing the amount used, the agent of the present invention can control the growth of broad leafy plants. The active agent of the above formula can be not only dispersed or dissolved in water to be used, but also blended with various assistants such as a diluent, a solvent, an emulsion, a wetting agent, etc. to be used as dust, granular, wettable powder, solution, emulsion, etc. And also, the active ingredient represented by the above-mentioned formula can be blended with other agricultural active ingredients, fertilizer, soil, etc. The compound of the present invention has a strong herbicidal effectiveness when applied to the soil.

The present invention is further illustrated by the following examples in which "%" indicates "percent by weight."

EXAMPLE 139

14% of 2-(4-nitrophenoxy)-3,5-dichloropyridine, 81% of bentonite, and 5% of calcium lignin sulfonate were crushed and mixed, and were granulated with adding water. Rice seedlings were transplanted to a paddy field which was ordinarily cultivated and fertilized and was 4-5 cm. in water-depth. On the seventh day after transplanting the above granulated agent was spread by head in 420 g. of active ingredient per 10 ares. On the thirtieth day after the agent was treated it has been observed that the growth of barnyard grass was remarkably controlled and the growth of weeds (slender spikerush, toothcup, waterwort, *Dopatrium junceum*) was considerably controlled. On the other hand, little influence of the agent on the paddy rice was recognized.

EXAMPLE 140

20% of 2-(3,5-dimethylphenoxy) - 6 - methylpyridine, 5% of sodium lignin sulfonate, and 75% of mineral powder were crushed and mixed, and prepared wettable powder. Small stones and soil were placed in 1/10,000 are porcelain plots and were absorbed water from bottom to make a field state. During the test the water content in the plot was maintained in approximate 60%. A given amount of seeds of barnyard grass, large crabgrass, and cucumber were sowed in the plot, covered with soil in thickness of 1 cm., and allowed to stand in a greenhouse. On the third day after sowing, an aqueous dispersion of the above agent was poured uniformly on the surface of soil in the rate of 400 g. of active ingredient per 10 ares. After the agent was treated, each was slightly germinated on the ground, but was completely killed.

EXAMPLE 141

20% of 2-(4-chlorophenoxy)-5-chloropyridine, 70% of xylol, and 10% of polyoxyethylene lauryl ether were dissolved uniformly to make an emulsion. A plot was prepared in the same manner as in Example 140, and was sowed with 10 seeds of barnyard grass, tomato, and mung bean and covered with soil in approximately 1 cm. of thickness and allowed to stand in a greenhouse. On the third week after sowing, a solution prepared by diluting the above emulsion with water to 4,000 p.p.m. and adding a small amount of spreader was sprayed uniformly on a stalk and leaf in the rate of 20 ml. per plot by a hand sprayer. On the fourteenth day after spraying the agent, it was observed that in a tomato and mung bean the periphery of leaf was colored to brown but was not killed while a barnyard grass was gradually killed.

We claim:

1. A compound represented by the formula

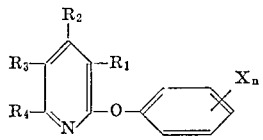

wherein each of $R_1$ and $R_3$ is a hydrogen atom or a chlorine atom; each of $R_2$ and $R_4$ is a hydrogen atom or a methyl group; X is a methyl group or a nitro group; and $n$ is an integer of 1 to 3, provided that, at least one of $R_1$, $R_2$, $R_3$ and $R_4$ is a chlorine atom or a methyl group and, when at least one of $R_1$ and $R_3$ is a chlorine atom, $R_2$ and $R_4$ are hydrogen atoms and, when at least one of $R_2$ and $R_4$ is a methyl group, $R_1$ and $R_3$ are hydrogen atoms.

2. A compound represented by the formula

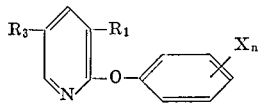

wherein $R_1$, $R_3$, X and $n$ are as defined in claim 1, provided that at least one of $R_1$ and $R_3$ is a chlorine atom.

3. A compound represented by the formula

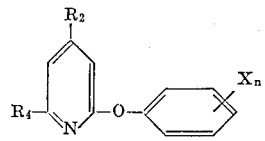

wherein $R_2$, $R_4$, X and $n$ are as defined in claim 1, provided that at least one of $R_2$ and $R_4$ is a methyl group.

4. A compound represented by the formula

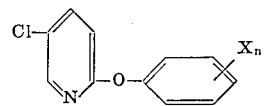

wherein X and $n$ are as defined in claim 1.

5. A compound represented by the formula

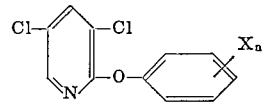

wherein X and $n$ are as defined in claim 1.

6. A compound represented by the formula

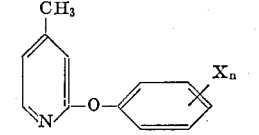

wherein X and $n$ are as defined in claim 1.

7. A compound represented by the formula

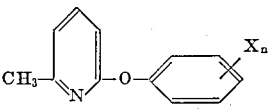

wherein X and $n$ are as defined in claim 1.

8. A compound as set forth in claim 5 in which the compound represented by the formula is 2-(4 - nitrophenoxy)-3,5-dichloropyridine.

9. A compound as set forth in claim 7 in which the compound represented by the formula is 2-(3,5-dimethylphenoxy)-6-methylpyridine.

10. A herbicidally effective salt of a compound of claim 1 or an N-oxide thereof.

References Cited

UNITED STATES PATENTS 3,429,689    2/1969    Duerr et al. _____ 260—297 X
2,583,425    12/1949    Hawley _____ 167—30

OTHER REFERENCES

Chem. Abstracts, vol. 64, column 5050, February 1966, abstracting Netherlands application No. 6501589.

ALAN L. ROTMAN, Primary Examiner

U.S. Cl. X.R.

71—94